(12) United States Patent
Curtis

(10) Patent No.: X3767
(45) Date of Patent: Oct. 15, 1823

(54) CARDING & SPINNING WOOL

(76) Inventor: Philo C Curtis

Philo C. Curtis
Letters Patent

The Schedule referred to in these Letters Patent and mak
ing part of the same containing a description in the words of the
said Philo C. Curtis himself of his improvement in con
structing machinery in such a form as to receive the wool
from a carding machine and convert it into rovings -
That which I claim as my invention or discovery in this
specified machinery is the constructing of and applying it
to a carding machine in such a form as to receive the
wool from the machine and wind it on spools with a
suitable size and twist to be spun on a jenny or other-
wise: the construction of the machinery may be as follows:
The dolpher may be about 14 inches in diameter; made
in the common form and covered with filleting cards: the
strips of card should be about 1 1/2 of an inch wide.
It should be puton in strips quite around the dolpher,
and not less than one inch apart; so that there will be no
connection of wool from one strip to another. the dolph
er must have two motions. one rotary the other alternate
from side to side of the frame or a sufficient distance to
clear the main cylinder: the motion endwise may be
given by fluting the ends of the dolpher a zigzag form,
and placing a roller at each end on pins fast in the
frame: or there may be two dolphers placed one above
the other and covered in the same manner, and set so
that one will receive the wool where the other leaves
it on the main cylinder, it may be separated from the
dolpher in the common form with a comb plate or with
a set of rollers set near the card after the wool leaves the
card, it is drawn through a guide by a pair of rollers from
which it passes to the spindle, on which there is a spool
that - that receives it as fast as it draws between the rollers: the
rollers may receive their motion from the doffer or main cylinder,
and must correspond so as to receive the wool as fast as it is
disengaged from the doffer: the spindle and flier is
constructed much in the form of a double speeder. Spindle
and flier for roping cotton: the spool and spindle must be
geered the motion of the spool is graduated as it fills.
by means of two cones. on which there is a belt that moves
from one end of the cones to the other whilst the spool
is filling:. the spools and spindles may be driven
from the main cylinder by means of a pulley on the shaft
of the spools: vibrate up and down by means of a heart-
motion, similar to those used for cotton spinning;

Witnesses
Abijah Hubbard
Daniel Wells

Philo C. Curtis (495 words)

Exd.
M.G.C.

DRAFTSMAN'S DIVISION.

*All communications should be addressed to*
"The Commissioner of Patents.
Washington, D. C."

2—328 a.

*DEPARTMENT OF THE INTERIOR,*

United States Patent Office,

*Washington, D. C.,* ........................, *189*...

*SIR:*

*The printed* ......c[illegible]...... *of Patent No* P. G. Curtis Oct 15, 1823

......are...... *exhausted.*

*As soon as printed a copy will be mailed you to complete your order.*

*By direction of the Commissioner:*

*Very respectfully,*

.......................................
*Chief Clerk.*

8143b6-97-5m